(12) United States Patent
Badr

(10) Patent No.: US 6,567,194 B1
(45) Date of Patent: May 20, 2003

(54) OPTICAL COMMUNICATION NETWORK AND PROTECTION METHODS

(75) Inventor: Nabil M. Badr, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

(21) Appl. No.: 09/375,704

(22) Filed: Aug. 17, 1999

Related U.S. Application Data

(60) Provisional application No. 60/096,779, filed on Aug. 17, 1998.

(51) Int. Cl.$^7$ .............................................. H04B 10/08
(52) U.S. Cl. ........................ 359/110; 359/119; 370/222
(58) Field of Search ................................ 359/110, 118, 359/119, 117, 124, 154, 173; 370/221, 222, 223, 225, 228

(56) References Cited

U.S. PATENT DOCUMENTS

| 5,446,809 | A | | 8/1995 | Fritz et al. ..................... 385/17 |
|---|---|---|---|---|
| 5,933,258 | A | * | 8/1999 | Flanagan et al. ............ 359/110 |
| 5,974,027 | A | | 10/1999 | Chapman ..................... 370/228 |
| 6,038,044 | A | * | 3/2000 | Fee et al. ..................... 359/119 |
| 6,046,832 | A | * | 4/2000 | Fishman ....................... 359/119 |
| 6,046,833 | A | * | 4/2000 | Sharma et al. ............... 359/119 |

FOREIGN PATENT DOCUMENTS

| EP | 0949 777 | 10/1999 | ............ H04J/14/02 |
|---|---|---|---|

OTHER PUBLICATIONS

Demeester, Piet, Resilience in WDM networks, All Optical Network Conference, organized by Vision in Business, London, Jun. 1998.

* cited by examiner

Primary Examiner—Thomas Mullen

(57) ABSTRACT

Optical systems of the present invention are configured in optical networks including a plurality of optical switch nodes interconnected by a plurality of optical transmission fibers, or other waveguides. The transmission fibers in the network can provide working and/or protection capacity for information, or communications traffic, being transmitted through the network. In various embodiments of the network, multiple diverse, working routes are provided on a single fiber path interconnecting a plurality of switch nodes. The multiple, diverse working routes can then be protected using a common protection fiber or path to provide shared protection. The switch nodes include optical switch configured to provide various levels of optical switching depending upon the network configuration. For example, line switches as well as optical cross-connects and routers can be deployed in the present invention to switch one or more wavelengths between the working and protection fibers. The optical systems can be further configured to carry lower priority traffic on the protection fibers or wavelengths during normal operation to increase the overall normal operating capacity of the system.

14 Claims, 3 Drawing Sheets

OPTICAL COMMUNICATION NETWORK AND PROTECTION METHODS

CROSS-REFERENCE TO RELATED APPLICATIONS

This application claims the benefit of U.S. Provisional Patent Application Ser. No. 60/096,779 filed Aug. 17, 1998, which is incorporated herein by reference.

STATEMENT REGARDING FEDERALLY SPONSORED RESEARCH OR DEVELOPMENT

Not Applicable

BACKGROUND OF THE INVENTION

The present invention is directed generally to optical transmission networks. More particularly, the invention relates to optical transmission systems including protection capability for use in optical communication networks.

Communications transport systems are used to transport information over a substantial portion of the world. This extensive communication access requires enormous amounts of equipment to provide the necessary infrastructure for the systems. In addition, much of the equipment and almost all of the transport media is remotely located and necessarily exposed to the environment.

In view of the necessary exposure of transmission systems to uncontrolled environments, it is not uncommon for failures to occur along a transmission path. However, if communication systems are to be effective it is necessary to have a high degree of reliability in the system. Thus, communication systems must provide for protection of the information being transmitted through the systems, as well as for restoration of failed links in the system.

The reliability of service provided by a transmission system is inversely proportional to the frequency of failures in the transmission system. One of the most common failures in fiber optic transmission networks is a fiber break. When a fiber break or other failure occurs in a transmission link, the traffic intended to pass through the link must be rerouted through another path until the link is restored. Another common source of failures in optical transmission network is an equipment failure. The amount of traffic that is lost upon an equipment failure depends upon the particular piece of failed equipment in the network. For example, in most, if not all, currently available fiber optic transport networks, a line amplifier failure will result in a complete loss of traffic traveling through an optical link containing the failed line amplifier. Whereas, a transmitter or a receiver failure will generally result only in the loss of the wavelengths associated with the failed transmitter or receiver.

Despite the persistent hazards of uncontrolled exposure to environmental conditions and inevitable equipment failures, it is imperative that communications service providers supply high quality service. Therefore, service providers have developed protection schemes to provide automatic traffic restoration upon a transmission link failure and have required redundant equipment systems to decrease the effective failure rate of the link.

Protection schemes generally are categorized based on the relationship of a working channel and a protection channel and the topology of the network. If information is transmitted through the network on both a working channel and a protection channel, the schemes are referred to as providing one plus one ("1+1") protection. Upon a failure of the working channel, the network switches to the protection channel. If information is switched from a working channel to protection channel or working path to a protection path when a failure occurs, the schemes are referred to as one for one ("1:1") protection schemes. More generally, M protection channels or paths can be shared between N working channels or paths, which is generally designated as M:N protection. Similarly, M protection channels can carry the same information as the working channel to provide 1+M protection.

Protection schemes can be implemented using various multiple fiber switching topologies, which generally fall into two distinct classes. The first class of protection schemes is referred to as Unidirectional Path-Switched Ring ("UPSR") in SONET, or Dedicated Protection Ring ("DPRing") in SDH. The second class is known as Bi-directional Line-Switched Ring ("BLSR") in SONET, or Multiplex Section-Shared Protection Ring ("MS-SPRing") in SDH. UPSR and BLSR schemes can implemented using either electrical or optical switching, O-BLSR and O-UPSR.

In UPSR schemes, working fiber paths for each direction connecting two nodes are on the same fiber ring and the protection paths for each direction are on a different fiber ring. Traffic from an origination node is sent along both the working and protection paths to a destination node. In the event of a failure of the working fiber path using UPSR protection, the destination node electrically or optically switches to the protection path to receive the traffic.

In BLSR schemes, transmission capacity of the ring fibers is divided between working and protection capacities, which carry traffic in opposite directions. Communications traffic is sent between origination and destination nodes using the working capacity of the ring.

When a failure occurs, the nodes immediately adjacent to and on both sides of the failure switch the traffic to the protection capacity on a different fiber, which propagates in the opposite direction. Traffic is looped back around the failure by the two proximate switches using the protection fiber generally without further reconfiguration of the system. In transoceanic BLSR applications, additional switching may be performed to minimize the additional distance traveled by the rerouted traffic.

BLSR is available in 2-fiber and 4-fiber implementations. In 4-fiber implementations, a protection fiber is provided for each working fiber and traffic is rerouted by switching between the working and protection fibers. In the 2-fiber implementations, the working and protection capacities are time division multiplexed ("TDM") on the same wavelengths, when electrical BLSR switching is performed. When 2 fiber, optical BLSR switching is performed, wavelengths are allocated to working channels on one fiber and to protection channel on the other fiber to allow the wavelength to be multiplexed.

Also, some BLSR schemes allow lower priority traffic to be transported using the protection capacity to increase the system capacity and utilization efficiency during normal operation. If protection switching is necessary, the lower priority traffic is dropped in favor of protecting the higher priority traffic.

As the demand for transmission capacity continues to grow, there is an increasing need to efficiently use the available transmission capacity and protect the information being transported through the systems. The increased amount of traffic being carried on each fiber places increased importance on the ability to effectively protect the information, because each failure results in higher revenue losses for service providers. Accordingly, there is a need for optical transmission systems and protection schemes that provide effective protection with increasing wavelength efficiencies for use in long distance communication systems.

BRIEF SUMMARY OF THE INVENTION

The present invention addresses the need for higher reliability optical transmission systems, apparatuses, and methods. Optical systems of the present invention are configured in optical networks including a plurality of optical switch nodes interconnected by a plurality of optical transmission fibers, or other waveguides. The transmission fibers provide working and/or protection capacity for information, or communications traffic, being transmitted through the network.

In various embodiments of the network, multiple diverse, working routes are provided on a single fiber path interconnecting a plurality of the switch nodes. Shared protection for the multiple, diverse working routes can then be provided using a common protection fiber or path in the system.

The switch nodes include optical switch configured to provide various levels of optical switching depending upon the network configuration. For example, line switches as well as wavelength selective optical cross-connects and routers can be deployed as optical switches in the switch nodes. The optical switches are configured to introduce, remove, and/or pass various signal wavelengths through the working and protection paths. The switch nodes will function differently depending upon whether the node is an origination, destination, or intermediate switch node with respect to an individual signal wavelength or group of wavelengths. The optical systems can be further configured to carry lower priority traffic on the protection fibers or wavelengths during normal operation to increase the overall normal operating capacity of the system.

The use of optical switching at the switch nodes along the working and protection paths connecting signal wavelength origination and destination nodes decreases the amount of redundancy necessary for optical protection. Accordingly, the present invention addresses the aforementioned concerns by providing optical systems apparatuses, and methods having increasingly flexible protection schemes. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same; wherein like members bear like reference numerals and.

DESCRIPTION OF THE INVENTION

Figure 1A:
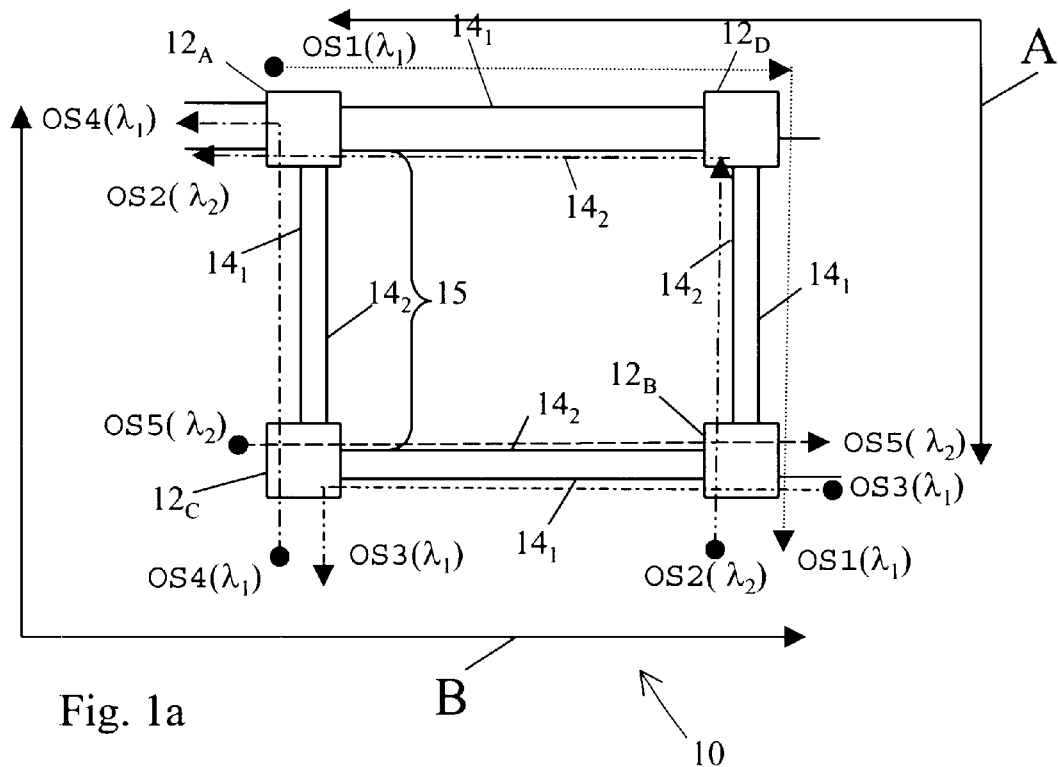
FIGS. 1–3 show optical system embodiments.

Optical systems 10 of the present invention include a plurality of optical switch nodes 12 that interconnect a plurality of optical transmission fibers, or other waveguides, 14 forming optical links 15 between the optical nodes 12 (FIG. 1). As shown in FIG. 2, the optical links 15 can further include uni- and/or bi-directional optical amplifiers 16 configured to optically amplify optical signals passing through the link 15 between the nodes 12 to overcome optical signal attenuation in the fiber 14.

As further shown in FIG. 2, the nodes 12 may include one or more transmitters 18 and configured to transmit information via the optical signals (OS) carried by one or more information carrying signal wavelengths, or signal channels, $\lambda_i$. The nodes 12 may further include one or more optical receivers 20 configured to receive the optical signals OS from other nodes 12. The optical network 10 can be controlled via a network management system 22, as well as by node to node control schemes. In addition, the optical system 10 can be configured to provide uni-directional or bi-directional transmission in each fiber 14.

The transmitters 18 can transmit the information using directly or externally modulated optical carrier sources or optical upconverters. The receivers 20 can include both direct and coherent detection receivers. For example, N transmitters 18 can be used to transmit M different signal wavelengths to J different receivers 20.

In various embodiments, one or more of the transmitters 18 and receivers 20 can be wavelength tunable to provide wavelength allocation flexibility in the optical network 10. The transmitters 18 and receivers 20 can be also connected to interfacial devices 24, such as electrical and optical cross-connect switches, IP routers, etc., to provide flexibility in transmitting and receiving information in the network 10. The interfacial devices 24 can be configured to receive, convert, and provide information in one or more various protocols, encoding schemes, and bit rates to the transmitters 18, and perform the converse function for the receivers 20. The interfacial devices 24 also can be used to provide edge protection switching in various nodes 12 depending upon the configuration. The optical system 10 may also include other optical components, such as one or more broadcast and/or wavelength reusable add/drop devices disposed with the switch nodes 12 or separately along the transmission fiber 14.

Optical combiners 26 can be provided to combine optical signals from different optical paths onto a common path. Likewise, optical distributors 28 can be provided to distribute optical signals from a common path to a plurality of different optical paths. The optical combiners 26 and distributors 28 can include wavelength selective and non-selective ("passive") fiber and free space devices, as well as polarization sensitive devices. Passive or WDM couplers/splitters, circulators, dichroic devices, prisms, gratings, etc. can be used alone, or in combination with various tunable or fixed, high, low, or band pass or stop, transmissive or reflective filters, such as Bragg gratings, Fabry-Perot devices, dichroic filters, etc. in various configurations of the optical combiners 26 and distributors 28. Furthermore, the combiners 26 and distributors 28 can include one or more serial or parallel stages incorporating various devices to multiplex, demultiplex, and broadcast signal wavelengths $\lambda_i$ in the optical systems 10.

In optical systems 10 of the present invention, working capacity in the fibers 14 is allocated such that a common protection fiber path can be employed for a plurality of diverse working paths. In addition, at least a portion of the various paths can serve as working paths, as well as protection paths by employing different wavelengths on each fiber 14.

The optical switch nodes 12 are configured to provide either wavelength selective or line switching between the working and protection fibers 14 entering and exiting the nodes 12. The switch nodes 12 are operated differently depending upon whether the switch node 12 is an origination or destination node for the information, or the switch node is intermediately disposed along the working or protection paths between the origination and destination nodes. Origination switch nodes are configurable to switch optical signals being introduced into the network 10 between working and protection paths, which provide diverse routes to the destination switch node. Destination nodes are configurable to remove optical signals from the network 10 from either the working and protection paths. Intermediate switch nodes are configurable to pass optical signals in the working and protection wavelengths passing between the origination and destination nodes.

In various embodiments, optical line switches can be used to interconnect the input fibers with the output fibers. Various mechanical, acousto-optic, thermo-optic, and doped fiber switches, as well as other line switches can be employed in the present invention.

Optical wavelength cross connect switches and routers can also be employed to provide liner control over the signals being protection switched in the nodes 12. For example, U.S. Pat. No. 5,446,809 issued to Fritz, et al. discloses a wavelength selective switch that can be used in the present invention. Other single wavelength cross-connect switch fabric that employ a non-selective switch fabrics between wavelength demultiplexers and multiplexers can also be used as the optical switch.

In addition, commonly assigned U.S. Patent application Ser. No. 09/119,562, now U.S. Pat. No. 6,449,073, which is incorporated herein by reference, discloses an optical cross connect/router that provides for switching multiple signal wavelengths, or groups of wavelengths, from an input port to one or more output ports. The wavelength selective switches/routers provide additional flexibility in reconfiguring the network 10 in the event of a fiber cut or other failure along one or more of the optical links 15.

Figure 2:
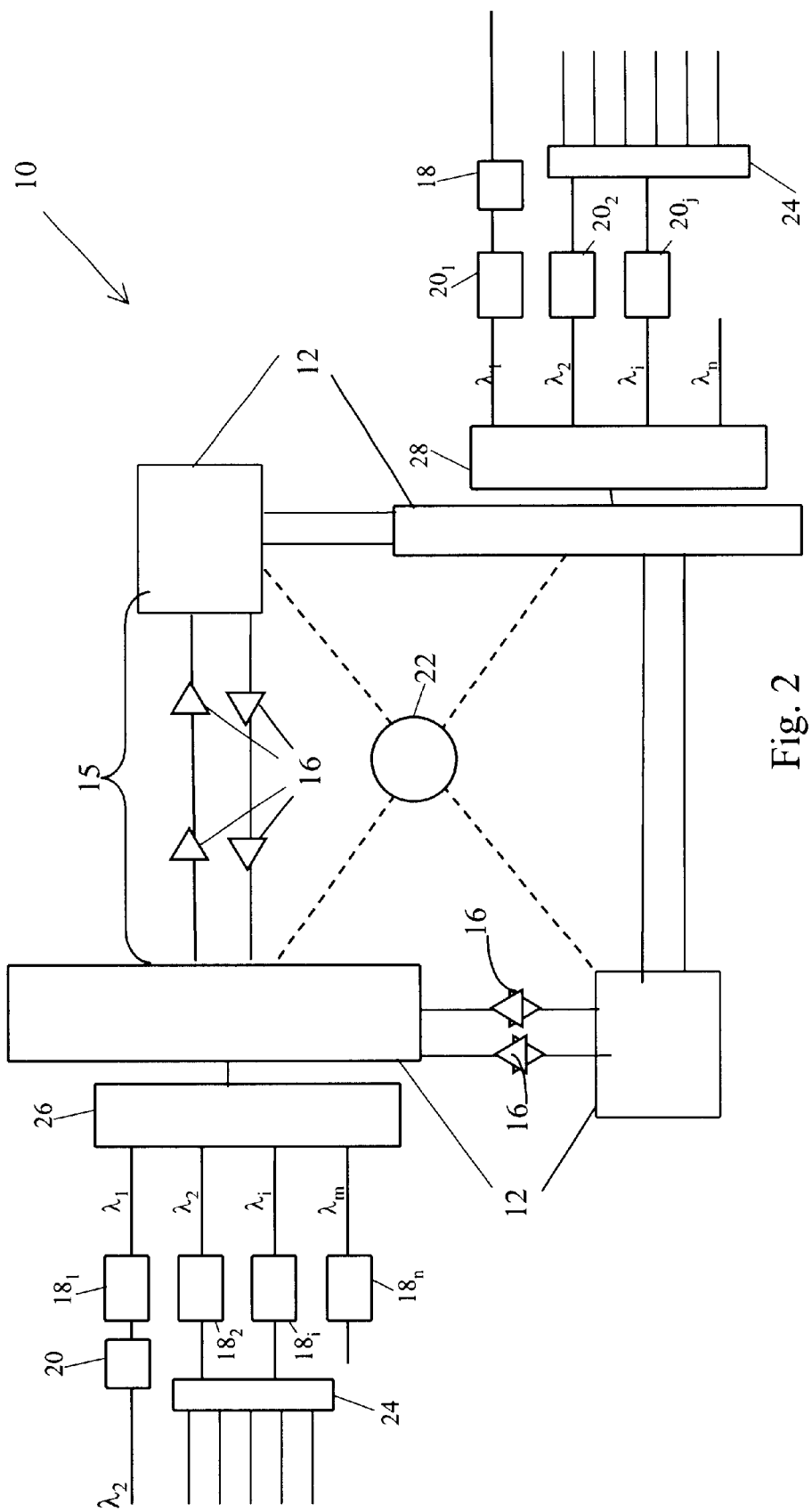

An exemplary description of various protection schemes of the present invention is provided with reference to FIGS. 1a&b, which show four switching nodes $12_{A-D}$ that may represent a portion of, or the entire, optical network 10. In normal operation, a first optical signal (OS1) at a first optical working wavelength $\lambda_1$ can enter the optical network 10 at optical switch node $12_A$. The first optical signal OS1 can be routed through a first fiber $14_1$ and optical switch node $12_D$ along a first optical path designated "A", to optical switch $12_B$, where it can exit the portion of the network 10 shown in the Figure. In this example, the first fiber $14_1$ provides a working path for optical signals transmitted via switch node $12_A$ to switch node $12_B$ during normal operation.

Conversely, a second optical signal (OS2) at a second optical working wavelength $\lambda_2$ can enter the optical network 10 at optical switch node $12_D$. The second optical signal OS2 can be routed through a second fiber $14_2$ and optical switch node $12_D$ along path A to node $12_A$, where it can exit the network 10.

A third optical signal OS3 at the first optical working wavelength $\lambda_1$ can be introduced into the optical network 10 onto the first fiber $14_1$ at optical switch $12_B$. The network 10 can be configured to remove the third optical signal OS3 at various points along path B including switch node $12_A$. As shown in FIG. 1a, the third optical signal OS3 can be removed at switch node $12_C$, thereby allowing a fourth optical signal (OS4) using the first wavelength $\lambda_1$ to be introduced on the first transmission fiber $14_1$. The fourth optical signal OS4 can be transmitted along path B to the optical node $12_A$. Similarly, a fifth optical signal OS5 can be introduced along path B on the second fiber $14_2$ and transmitted to the optical node $12_B$.

Because multiple signals are transmitted upon a single fiber path connecting at least three switch nodes, a single protection fiber can be shared by the multiple signals. In the event of a fiber cut, the origination and destination switch nodes 12 of the optical signals in the network 10 are reconfigured to route the optical signals through a different fiber along a different optical path between the origination and destination nodes. In FIG. 1a, optical signals OS1, OS3, and OS4 being transmitted on the first fiber $14_1$ can be protected by switching the respective signals to the second fiber $14_2$. Likewise, optical signals OS2 and OS5 being transmitted on the second fiber $14_2$ can be protected by switching the respective signals to the first fiber $14_1$.

Figure 1B:
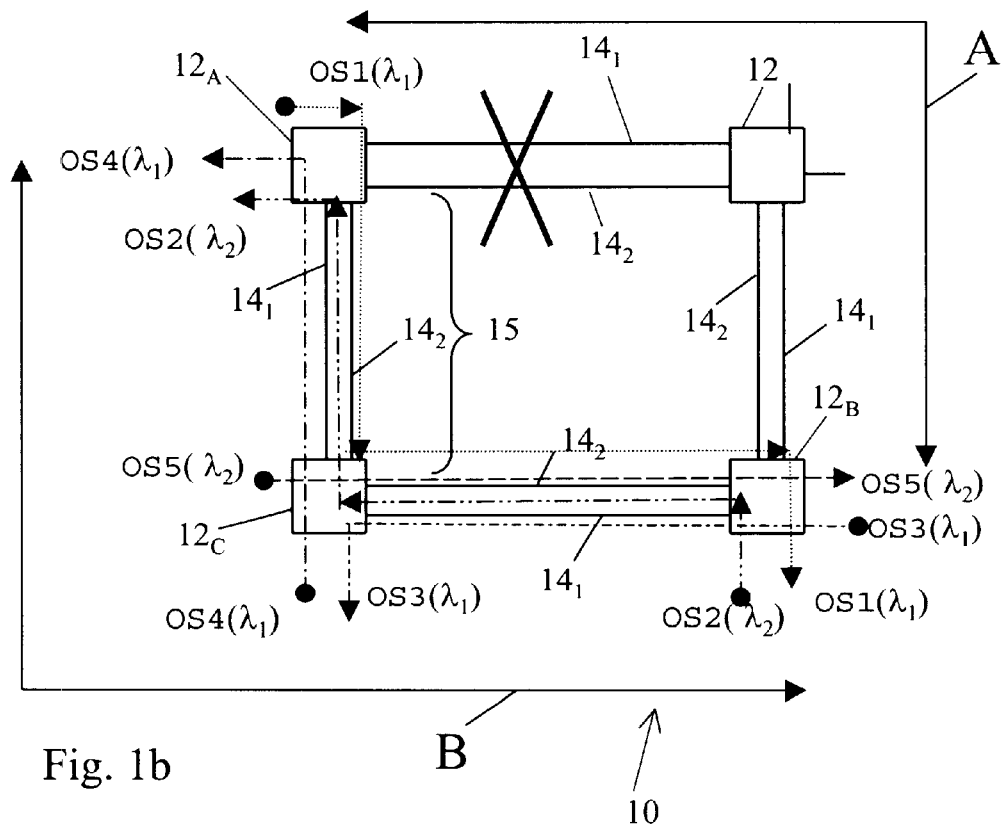

For example, if a fiber cut occurs at point X in FIG. 1b, optical signals being transmitted in path A have to be rerouted. Switch node $12_A$ is reconfigured to route the first optical signal OS1 through the second fiber $14_2$ along path B. Switch node $12_B$ is reconfigured to receive the first optical signal OS1 from the second fiber $14_2$. Furthermore, switch node $12_C$ and any other switch nodes between the origin and destination nodes, $12_A$ and $12_B$, are configured to pass the first wavelength $\lambda_1$ on the second fiber $14_2$ and the second wavelength $\lambda_2$ on the first fiber $14_1$. In this manner, optical signals OS1 and OS2 are routed through path B along with optical signals OS3, OS4, and OS5 and bypass the fiber cut without having to loop back onto the first fiber $14_1$. The ability to optically reroute the optical signal from a working fiber to a protection fiber without having to loop back onto the first fiber provide increased flexibility in configuration of the optical system 10.

Figure 3:
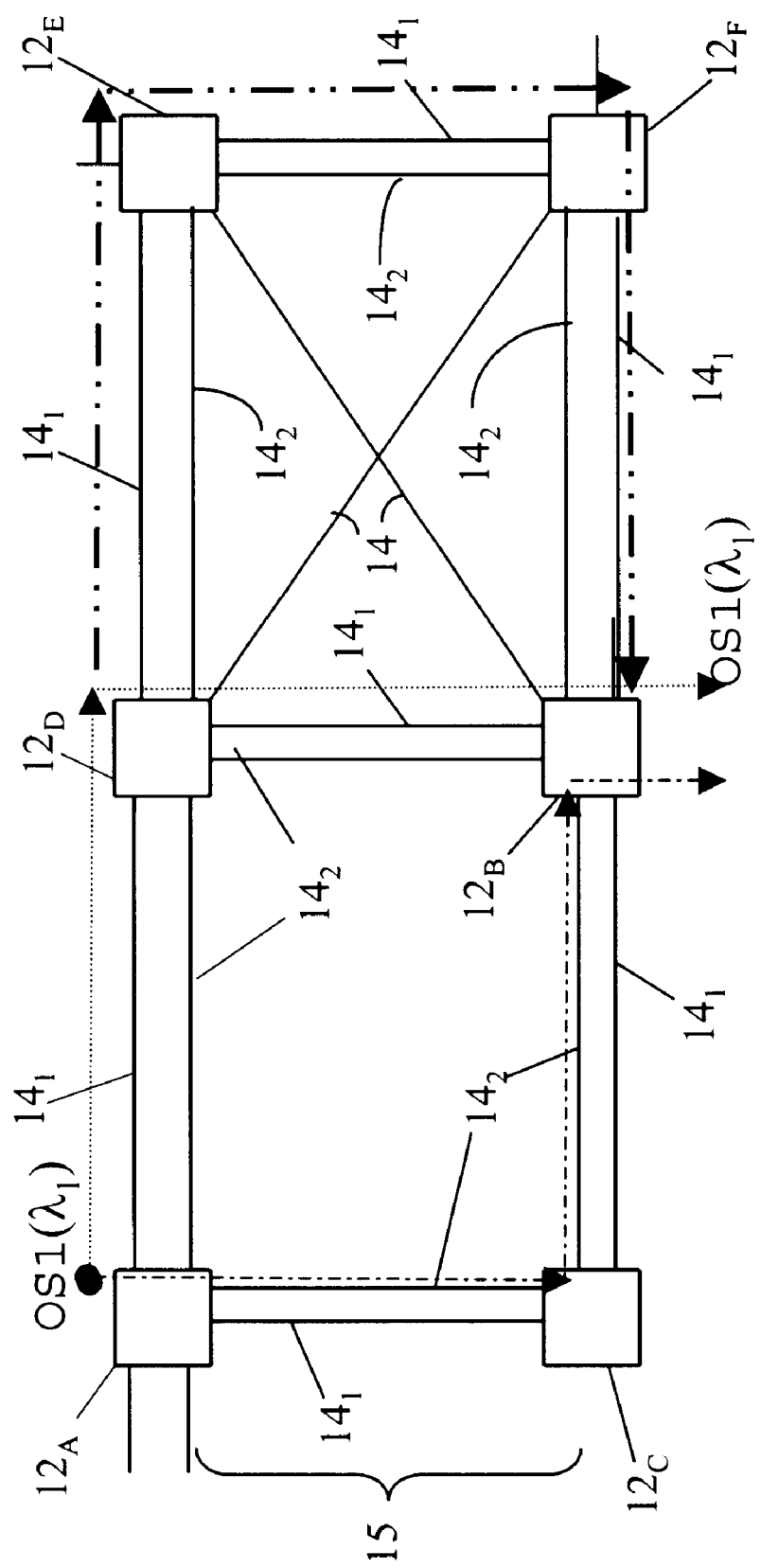

As shown in FIG. 3, the present invention can be implemented on more expansive mesh architectures that provide a plurality of protection paths between switch nodes $12_A$ and $12_B$. For example, the embodiment shown in FIG. 3 provides three possible paths between switch nodes $12_A$ and $12_B$ that can be used to provide working and protection capacity. Shared path protection can implemented between all of the switch nodes, thereby providing protection against multiple fiber cuts disrupting service in the network. For example, the switch nodes 12 can be configured to route the first optical signal through switch nodes $12_{D-F}$ in the event of service disruptions between switch node $12_D$ and $12_B$, $12_C$ and $12_B$, and/or $12_A$ and $12_C$. It will be appreciated that the number of signal wavelengths $\lambda_i$, as well as the number of fibers 14 interconnecting the switch nodes will depend upon the capacity of the optical system 10.

Generally, the switch nodes 12 will be configured to merely switch the working wavelengths from the working fiber to the protection fiber. Thus, the working wavelengths carrying the information will be the same as the protection wavelengths in the system. However, the switch nodes 12 can be configured to provide either optical or electrical wavelength conversion or interchange, when a protection switch is performed. In those embodiments, the working wavelengths will not necessarily be the same as the protection wavelengths in the systems. It will be further appreciated that the switch nodes along the protection path and at the destination node will have to be reconfigured to handle the protection wavelength.

In the present protection scheme, the protection path or protection path wavelengths can be used to carry lower priority traffic between various switch nodes 12 in the network 10. Upon a failure in one of the links 15, the switch nodes are configured to drop the lower priority traffic and carry the protection traffic. In networks with multiple protection paths, such as in FIG. 3 embodiments, lower priority traffic can be further partitioned among the possible protection paths with the quality of service depending upon the probability of using a particular protection path.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical system comprising:

a first optical node configured to route a first optical signal at a first working wavelength to a second optical node via a first optical path;

a third optical node configured to route a second optical signal at said first working wavelength to said first optical node via a second optical path;

said first optical node being configurable to route the first optical signal at a first protection wavelength to said second optical node via a third optical path and a fourth optical path, wherein said third optical path provides optical communication between said first optical node and said third optical node, and wherein said fourth optical path provides optical communication between said third optical node and said second optical node; and, said third optical node being configurable to route the second optical signal at the first protection wavelength to said first optical node via said fourth optical path and a fifth optical path, wherein said fifth optical path provides optical communication between the second optical node and said first optical node.

2. The network of claim 1, wherein the first working wavelength and the first protection wavelength are the same wavelength.

3. The network of claim 1, wherein said first optical node includes an optical switch configurable to provide originating optical signals to one of said first and third optical paths, remove optical signals destined for said first optical node from said secondhand fifth optical paths and pass optical signals from said second and fifth optical paths to at least one of said first and third optical paths.

4. The network of claim 1, wherein said second optical node includes an optical switch configurable to provide originating optical signals to at least said fifth optical path, remove optical signals destined for said second optical node from said first and fourth optical paths and pass optical signals from at least said fourth optical path to at least said fifth optical path.

5. The network of claim 1, wherein said second node optically communicates with said third node via at least a sixth optical path.

6. The network of claim 1, wherein said third optical node includes an optical switch configurable to provide originating optical signals to at least said second and fourth optical paths, remove optical signals destined for said third optical node from at least said third optical path and pass optical signals from said third optical path to at least said fourth optical path.

7. The network of claim 1, wherein at least one of said first, second, and third optical nodes includes an optical switch configured to separate and switch individual signal wavelengths from a plurality of signal wavelengths.

8. The network of claim 1, wherein at least one of said first, second, and third optical nodes includes an optical switch configured to separate and switch groups of signal wavelengths comprising a subset of a plurality of signal wavelengths.

9. The network of claim 1, wherein each of said first, second, and third optical nodes includes an optical switch configured to separate and switch at least one signal wavelength from a plurality of signal wavelengths.

10. The network of claim 1, wherein each of said first, second, third, fourth, and fifth optical paths includes at least one optical fiber configured to carry optical signals.

11. The network of claim 10, wherein at least said first and second optical nodes are configured provide bi-directional transmission of optical signals via said first optical path.

12. An optical network comprising:

a first optical node configured to route a first optical signal at a first working wavelength to a second optical node via a first optical path;

a third optical node configured to route a second optical signal at said first working wavelength to a fourth optical node via a second optical path;

said first optical node being configurable to route said first optical signal at a first protection wavelength to said second optical node via a third, a fourth, and a fourth optical path, wherein said third optical path provides optical communication between said first optical node and said fourth optical node, and wherein said fourth optical path provides optical communication between said fourth optical node and said third optical node, and wherein said fifth optical path provides optical communication between said third optical node and said second optical node; and, said third optical node being configurable to route said second optical signal at said first protection wavelength to said fourth optical node via said fifth optical path and a sixth optical path, wherein said sixth optical path provides optical communication between said second optical node and said first optical node, and wherein said third optical node is further coupled to said third optical path.

13. The network of claim 12, wherein said first working wavelength and said first protection wavelength are the same wavelength.

14. The network of claim 12, further comprising a seventh optical path providing optical communication between said fourth optical node and said second optical node; and, an eighth optical path providing optical communication between said first optical node and said third optical node.

* * * * *